Patented June 21, 1932

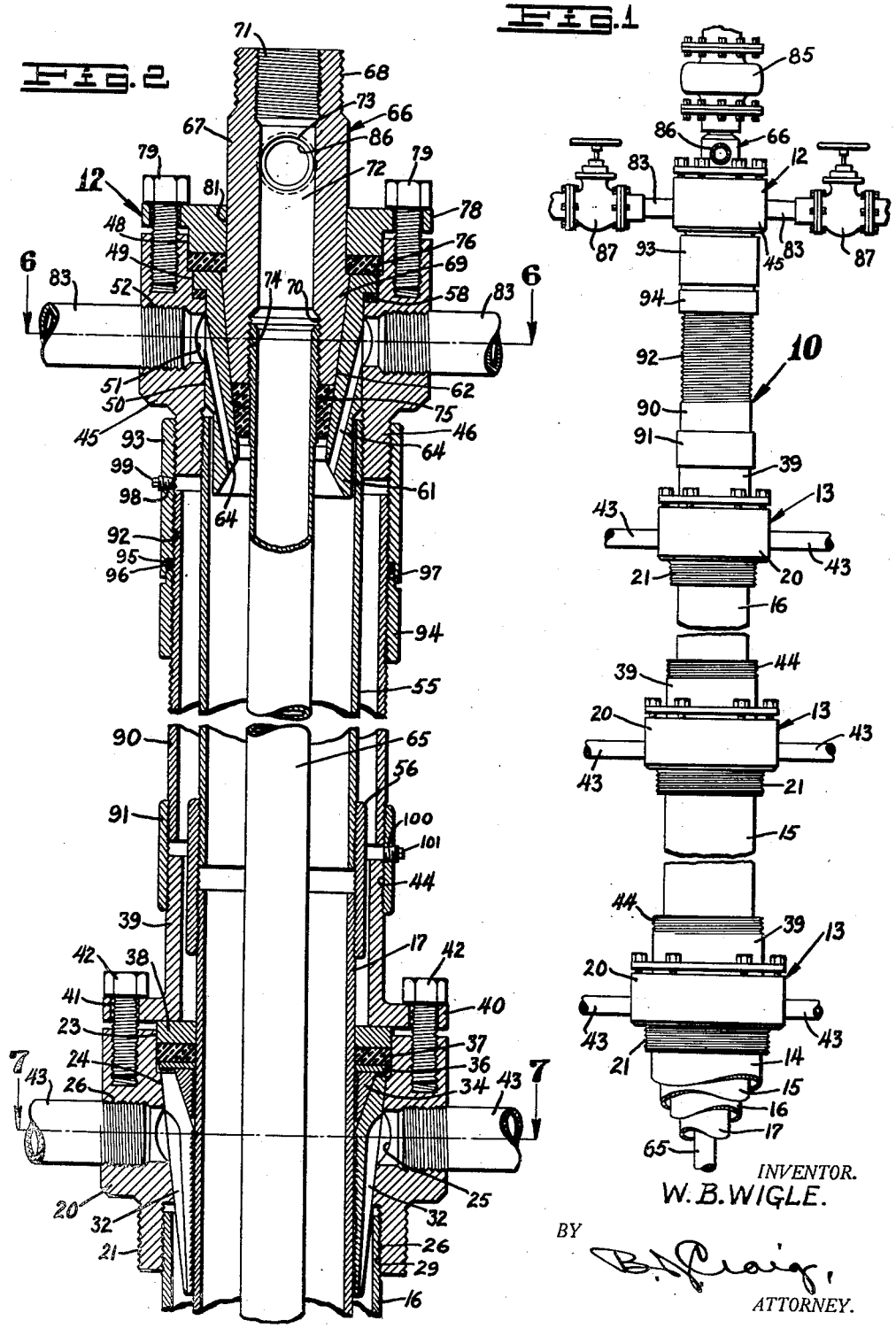

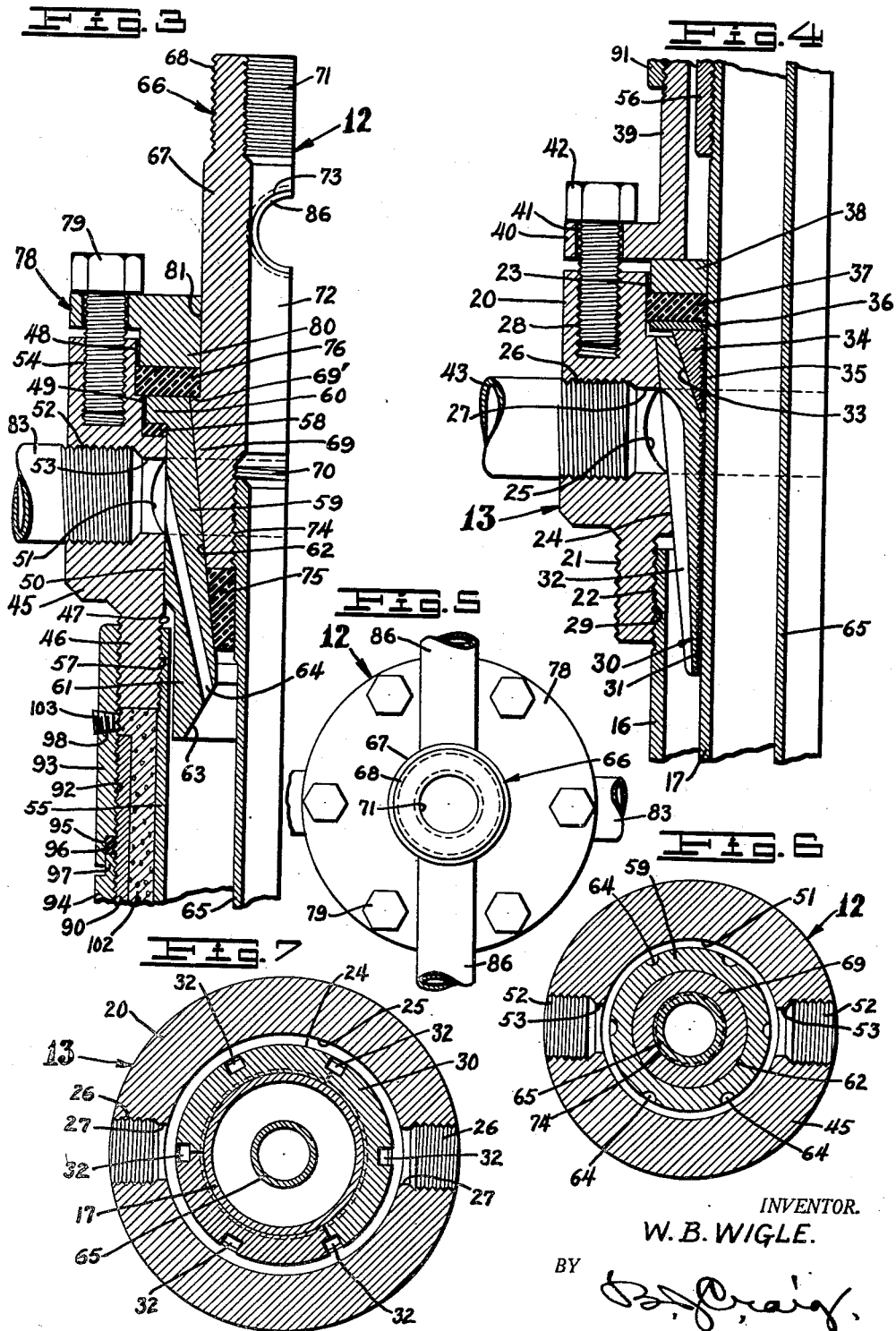

1,863,890

UNITED STATES PATENT OFFICE

WILSON B. WIGLE, OF COMPTON, CALIFORNIA

COMBINATION CASING HEAD AND CASING SUPPORT

Application filed June 19, 1930. Serial No. 462,273.

This invention relates to casing heads.

The general object of this invention is to provide an improved casing head particularly adapted for use on oil and gas wells.

Another object of this invention is to provide an improved casing head which is constructed in a novel manner whereby the length of the casing head is greatly reduced over the present type.

A further object of the invention is to provide a novel means for cementing around the casing.

A still further object of the invention is to provide a novel slip arrangement for supporting the casing.

Other objects and the advantages of this invention will be apparent from the following description taken in connection with the accompanying drawings wherein:

Fig. 1 is an elevation of the upper portions of a plurality of oil well casings showing my improved casing head and supporters thereon.

Fig. 2 is an enlarged central vertical section through the combination casing head.

Fig. 3 is a fragmentary section similar to Fig. 2 of the upper portion of my device.

Fig. 4 is a similar section of the lower portion of the device.

Fig. 5 is a top plan view of the device shown in Fig. 2.

Fig. 6 is a section taken on line 6—6 of Fig. 2, and

Fig. 7 is a section taken on line 7—7 of Fig. 2.

Referring to the drawings by reference characters I have indicated my combination casing head and supports generally at 10. As shown this device comprises a casing head indicated generally at 12 and a plurality of supports indicated generally at 13.

In a well containing four strings of casing as indicated at 14, 15, 16 and 17, three of the supports 13 and one casing head 12 are required as clearly shown in Fig. 1.

The supports 13 are all shown as constructed in the same manner except that the diameter varies to accommodate the various sizes of casing. Accordingly the construction of but a single support will be described and similar numerals used to identify the component parts of the others.

As shown the support 13 comprises a body portion 20 having at the lower end thereof a reduced externally threaded collar 21 in which a threaded recess 22 is provided. Adjacent the upper end of the body I provide a recess 23 and intermediate the recesses 22 and 23 and connecting the same I provide a reduced conically shaped aperture 24 which converges downwardly. Intermediate the length of the conical aperture 24 I provide an annular arcuate groove 25 which extends completely around the inner surface of the aperture 24.

In the body 20 I provide a pair of opposed threaded recesses 26 which communicate with reduced apertures 27 opening into the groove 25 and opening through the upper face of the body I provide a plurality of threaded recesses 28.

When a string of casing is set the support 13 is secured thereto by threads of the recess 22 engaging the upper threaded end 29 of the casing after which smaller casing may be lowered into the well through the support 13 and suspended from the support 13 by ordinary slips which fit in the conical aperture 24.

When it is desired to set the smaller casing such as indicated at 17 in Figs. 2 and 4, a plurality of conically shaped slips 30 which constitute a spider and which are positioned in the conical aperture 24 and tightly engage the surface thereof. The slips 30 are provided on their inner surface with teeth 31 which engage the outer surface of the casing and are shaped to bite into the casing to prevent downward movement of the casing.

In the outer faces of the slips 30 I provide a plurality of grooves or passageways 32 which extend from the lower ends of the slips to a point spaced from the top thereof and in register with the annular groove 25 of the body 20. Thus it will be seen that a plurality of passageways are formed through the slips from the space between the two casings to the groove 25.

Adjacent the upper end of the slips 30 I provide a conically shaped recess 33 which converges downwardly and in which I position a plurality of secondary slips 34 having teeth 35 on their inner surface which are shaped to bite into the casing on an upward movement thereof. The secondary slips 34 extend above the slips 30 into the body recess 23 and on the secondary slips 34 I position a ring 36. On the ring 36 I position a packing member 37 which is made of a resilient material such as a good grade of rubber and on the packing member I position a metal ring 38 which extends above the upper surface of the body 20.

Resting on the ring 38 I provide a sleeve 39 which includes an enlarged flange 40 provided with a plurality of apertures 41. Bolts 42 are positioned in the apertures 41 and engage the threads of the threaded body recesses 28 and tightly clamp the sleeve 39 to the body 20. When the sleeve 39 is tightly secured to the body 20 it forces the ring 28 downward against the packing 37 thereby compressing and expanding the packing and causing it to tightly engage the outer surface of the casing and the inner surface of the body recess 23. At the same time the packing forces the ring 36 downward against the secondary slips 34 thereby causing them to tightly engage the casing to prevent upward movement thereof. Furthermore the downward pressure of the secondary slips 34 forces the slips 30 into tighter engagement with the casing and the surface of the conical aperture 24 thereby preventing downward movement of the casing and forming a tight joint between the outer face of the slips 30 and the surface of the aperture 24.

Secured in the threaded recesses 26 of the body I provide pipes 43 the passageway through which may be controlled by suitable valves and which extend to a suitable reservoir.

From the foregoing it will be apparent that any gas in the space between the two casings will pass through the grooves 32 in the slips 30 into the annular body groove 25 and thence out through the apertures 27 into the pipes 43.

The smallest string of casing such as indicated at 17 preferably terminates below the top of the sleeve as clearly shown in Fig. 2, and the upper portion of the sleeve is preferably provided with a threaded portion 43 for securing thereto a shut off valve (not shown) during the continued drilling of the well.

The casing head 12 comprises a body portion 45 having at the lower end thereof a reduced externally threaded collar 46 in which a threaded recess 47 is provided. Adjacent the upper end of the body I provide a recess 48 having a reduced recess 49 in the bottom thereof. Connecting the recesses 47 and 49 I provide an aperture 50 which is shown as approximately of the same diameter as the threaded recess 47. Intermediate the length of the aperture 50 I provide an annular arcuate groove 51 which extends completely around the inner surface of the aperture 50.

In the body 45 I provide a pair of opposed threaded recesses 52 which communicate with reduced apertures 53 opening into the annular groove 51 and opening through the upper face of the body I provide a plurality of threaded recesses 54.

When it is desired to place the casing head 12 in an operative position on a well a section of casing 55 is connected to the upper end of the innermost casing 17 by a coupling collar 56. The upper end of the casing section 55 is threaded as at 57 and is adapted to engage the threads of the threaded recess 47 of the casing head for securing the casing head thereto. After the casing head has been secured in position a resilient packing ring 58 is positioned in the recess 49 and a spider 59 is positioned in the aperture 50. As shown the spider 59 includes an enlarged flange 60 at the upper end thereof which rests on the packing ring 58. The main portion of the spider is adapted to fit snugly in the body aperture 50 while the lower end of the spider is provided with a reduced portion 61.

The spider 59 includes an axial conically shaped aperture 62 which converges downwardly and communicates with a conically shaped recess 63 which converges upwardly. Extending from the recess 63 diagonally through the spider to a point below the top surface thereof and in register with the annular groove 51 in the body 45 I provide a plurality of apertures or passageways 64.

During the operation of lowering the tubing 65 into the well it may be suspended from the casing head 12 by ordinary slips (not shown) positioned in the conical spider aperture 62.

For suspending set tubing from the casing head I provide a plug 66 which includes a shank 67, a reduced externally threaded upper portion 68 and an enlarged frusto-conically shaped lower portion 69 which converges downwardly. A shoulder 69' is provided at the top of the portion 69. Adjacent the lower end of the plug I provide a threaded recess 70 and adjacent the opposite end thereof I provide a threaded recess 71, the two recesses being connected by a reduced aperture 72. In the shank 67 of the plug I provide opposed threaded apertures 73.

When it is desired to set the tubing the upper end thereof is provided with a threaded portion as indicated at 74. A conically shaped resilient packing member 75 is slipped over the tubing and positioned in the conical aperture 62 of the spider and then the tubing is secured in the threaded recess 70 of the plug and the plug lowered into the casing head in which position the conical portion 69 thereof is positioned in the conical aperture 62 of the spider. After the plug has been positioned in the casing head a resilient packing member 76 is positioned in the body recess 48 on top of the flange 60 of the spider.

A cap 78 is then secured to the casing head by a plurality of bolts 79 which engage the threads of the threaded body recesses 54. As shown the cap 78 includes a reduced portion 80 which fits within the recess 48 and engages the packing member 76 and a coaxial aperture 81 in which the shank 67 of the plug is positioned.

When the cap 78 is tightly secured to the body 45 the reduced portion 80 thereof forces the packing member 76 downward thereby compressing and expanding the same into tight engagement with the inner surface of the recess 48 and the outer surface of the plug shank 67. At the same time the packing member 76 engages the shoulder 69' at the juncture of the plug shank 67 and the conical portion 69 thereby preventing upward movement of the plug 66 and sealing the joint between the outer surface of the plug conical portion and the surface of the conical aperture 62 of the spider. Furthermore the packing member 76 prevents upward movement of the spider 59 and seals the joint between the inner surface of the recess 49 and the outer surface of the enlarged flange 60 of the spider.

When the various parts of the casing head are thus assembled, gas in the space between the tubing 65 and the casing 55 passes through the apertures 64 of the spider into the annular groove 51 of the body and thence out through the apertures 53 into pipes 83 secured in the threaded recesses 52 of the body. These pipes 83 are preferably provided with suitable control valves and preferably communicate with a gas holder or reservoir.

The reduced threaded portion 68 of the plug 66 is adapted to be secured to the master gate valve of a Christmas tree mechanism as indicated at 85. Secured in the threaded apertures 73 of the plug 66 I provide pipes 86 which are provided with control valves 87 and communicate with a suitable reservoir.

When the well is flowing the valves 87 are closed and the master valve is opened thereby allowing the flow to pass through the Christmas tree mechanism. When the well is being pumped suitable sucker rod packing means is secured to the upper end of the plug 66 and the valves 87 opened thereby allowing the flow to pass through the pipes 83.

In wells containing high gas pressure I preferably secure a section of pipe 90 to the sleeve 39 of the upper portion 13 by a collar 91 which engages the threaded portion 43 of the sleeve. The opposite end of the pipe 90 is provided with a threaded portion 92 on which I position a threaded collar 93 which engages the threads of the reduced collar 46 of the casing head body. Also on the threaded portion 92 and below the collar 93 I provide a collar 94.

The collar 93 includes a recess 95 in which a resilient packing member 96 is positioned, and the collar 94 includes a reduced portion 97 which is adapted to fit within the recess 95 of the collar 93. When the reduced portion 97 of the collar 94 is moved into tight engagement with the packing member 96 the packing member is compressed and forced into tight engagement with the inner surface of the recess 95 and the outer surface of the pipe 90 thereby forming a seal which prevents gas from escaping past the threads should it work past the threads in the body recess 47.

In the collar 93 I preferably provide a threaded aperture 98 which is normally closed by a plug 99 and in the collar 91 I provide a threaded aperture 100 which is normally closed by a plug 101.

As an extra precaution against heavy gas pressure the space between the casing 55 and the pipe 90 may be filled with concrete as indicated at 102 in Fig. 3. This may be accomplished by removing the plugs 99 and 101 and inserting the threaded end 103 of a nipple in the threaded aperture 98 of the collar 93 and then forcing the concrete or other suitable cementitious material into the space between the casing 55 and the pipe 90. After sufficient concrete has been forced therein the nipple may be removed but if this cannot be conveniently done the end of the nipple is sawed off as shown in Fig. 3.

If desired pipes 90 may be secured in position between each of the supports 13 in the same manner as between a support and the casing head 12.

By providing the grooves 25 in the supports with the passageways 32 in the slips leading thereto and the groove 57 in the casing head with the passageway 64 in the spider leading thereto, these devices are of much less length than the ordinary casing supports wherein the bottom of the slips are above the gas outlets and by providing means to cement around the casing between the supports and the casing head and the upper support a much better pressure resisting device is obtained.

From the foregoing description it will be apparent that I have provided a novel casing head and support which is simple in construction and highly efficient in use.

Having thus described my invention, what I claim is:

1. In combination with a well casing, a casing support including a body having an aperture, said casing extending through said aperture, casing supporting slips positioned in said aperture, said slips including toothed portions engaging said casing, said teeth being arranged to bite into said casing, there being a downwardly converging tapered recess adjacent the top of said slips, secondary slips positioned in said tapered recess and engaging the surface thereof, teeth on said secondary slips engaging said casing, and means to retain said secondary slips in a fixed position.

2. In combination with a well including a casing and a tubing, a casing support, said support including a body portion, means to support said body, means carried by said support for supporting said casing, a sleeve surrounding said casing and secured to said body, a casing head, said casing head including a body portion, means to secure said casing head body to said casing, means carried by said casing head body to support said tubing, a housing surrounding said casing between said casing support and said casing head, means to secure said housing to said casing support, means to secure said housing to said casing head and means in said housing whereby the space between said housing and said casing can be filled with concrete.

3. In combination with a well including a casing, a casing support, a body portion, means to support said body, said body having a conical aperture converging downward, said casing extending through said aperture, tapered casing supporting slips positioned in said aperture and engaging the wall of said aperture, said slips including toothed portions engaging said casing, said teeth being arranged to bite into said casing by downward pressure of said casing, there being a downwardly converging tapered recess adjacent the top of said slips, secondary slips positioned in said tapered recess and engaging the surface thereof, teeth on said secondary slips engaging said casing, said teeth being arranged to bite into said casing upon upward pressure of said casing, a sleeve surrounding said casing and secured to said body and means whereby said sleeve exerts a downward pressure on said secondary slips.

4. In a well casing support, a body portion, means to support said body, said body having an aperture, said casing extending through said aperture, slips positioned in said aperture and engaging the wall of said aperture, said slips including toothed portions engaging said casing, said teeth being arranged to bite into said casing by downward pressure of said casing, there being a recess adjacent the top of said slips, secondary slips positioned in said recess and engaging the surface thereof, teeth on said secondary slips engaging said casing, said teeth being arranged to bite into said casing upon upward pressure of said casing and means to hold said secondary slips in place.

5. In combination with a well casing and tubing, a casing support, said support including a body portion, said body having an aperture, said casing extending through said aperture, means positioned in said aperture for supporting said casing, a sleeve surrounding said casing and secured to said body, means whereby said sleeve retains said casing supporting means in a fixed position, a casing head, said casing head including a body portion, means to secure said casing head body to said casing, there being an aperture in said casing head body, means positioned in said body to support said tubing, a housing surrounding said casing between said casing support and said casing head, means to secure said housing to said casing support, means to secure said housing to said casing head and means in said housing whereby the space between said housing and said casing can be filled with concrete.

6. In combination with a well casing, a casing support including a body having an aperture, said casing extending through said aperture, casing supporting slips positioned in said aperture, said slips including portions engaging said casing, said slips being cut away at their tops to form a downwardly converging tapered recess adjacent the top of said slips, secondary slips positioned in said tapered recess and engaging the surface thereof, said secondary slips engaging said casing.

7. In combination with a well casing, a casing support including a body having an aperture, said casing extending through said aperture, casing supporting slips positioned in said aperture, said slips including toothed portions engaging said casing, said teeth being arranged to bite into said casing, said slips having their upper inner faces beveled to form a downwardly converging recess adjacent the top of said slips, secondary slips positioned in said converging recess and engaging the surface thereof, teeth on said secondary slips engaging said casing, and means to retain said secondary slips in a fixed position, said means including a packing member surrounding and engaging said casing and said body.

8. In a casing head, a body portion, a well casing, means to secure said body to the well casing, said body having an aperture therein and an outlet, a spider, said spider being positioned in said aperture and supported by said body, said casing engaging said spider and means to afford communication through said spider from the extension of the casing supported by said spider to the outlet in said spider.

9. In a well casing support, a body portion, means to support said body, said body having an aperture, said casing extending through said aperture, slips positioned in said aperture and engaging the wall of said aperture, said slips including portions engaging said casing, said slips being cut away to form a recess adjacent the top of said slips, packing means positioned above said slips and engaging the surface of said casing and means to urge said packing towards said slips to provide a fluid tight joint.

In testimony whereof, I hereunto affix my signature.

WILSON B. WIGLE.